United States Patent
Chakraborty et al.

(10) Patent No.: US 11,509,390 B2
(45) Date of Patent: Nov. 22, 2022

(54) RELIABLE DELIVERY OF DIGITAL SERVICES

(71) Applicant: Microsoft Technology Licensing, LLC, Redmond, WA (US)

(72) Inventors: Tusher Chakraborty, Bangalore (IN); Apurv Mehra, Bangalore (IN); Ranveer Chandra, Kirkland, WA (US); Siddharth Prakash, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/178,201

(22) Filed: Feb. 17, 2021

(65) Prior Publication Data

US 2021/0409110 A1 Dec. 30, 2021

(30) Foreign Application Priority Data

Jun. 30, 2020 (IN) .............................. 202041027906

(51) Int. Cl.
*H04B 7/185* (2006.01)
*H04L 65/612* (2022.01)

(52) U.S. Cl.
CPC ..... *H04B 7/18595* (2013.01); *H04B 7/18513* (2013.01); *H04B 7/18521* (2013.01); *H04B 7/18567* (2013.01); *H04B 7/18582* (2013.01); *H04L 65/612* (2022.05)

(58) Field of Classification Search
None
See application file for complete search history.

(56) References Cited

U.S. PATENT DOCUMENTS

| | | | |
|---|---|---|---|
| 8,495,688 B2 | 7/2013 | Jagadeesan et al. | |
| 8,776,161 B2 | 7/2014 | Gazier et al. | |
| 8,966,097 B1 | 2/2015 | Roseman et al. | |
| 9,088,577 B2 | 7/2015 | Zhu et al. | |
| 9,578,288 B2 | 2/2017 | Chen et al. | |
| 9,667,364 B2 | 5/2017 | Corson et al. | |
| 10,085,063 B2 | 9/2018 | Hainline | |
| 2007/0266414 A1* | 11/2007 | Kahn .................... | H04N 7/162 348/E7.071 |
| 2012/0284759 A1 | 11/2012 | Lv et al. | |
| 2013/0031211 A1 | 1/2013 | Johnson et al. | |
| 2014/0306833 A1 | 10/2014 | Ricci | |
| 2017/0085328 A1 | 3/2017 | Dickemann et al. | |

(Continued)

OTHER PUBLICATIONS

"ALTBalaji partners with Microsoft and Eko India Financial Services to pilot a cloud coordinated content distribution network that saves cellular data", Retrieved from: https://news.microsoft.com/en-in/altbalaji-partners-microsoft-blendnet-technology-saves-cellular-data/, Sep. 24, 2019, 04 Pages.

(Continued)

*Primary Examiner* — Shripal K Khajuria

(57) ABSTRACT

Systems and methods for reliable content delivery from a satellite to sub-edge devices are described. Content is delivered to a plurality of edge devices. Missing portions of the content are identified. One or more of the missing portions are selected, and the selected portions are recovered via a satellite network or a non-satellite network. The recovery is coordinated by a central cloud device based on one or more recovery factors.

20 Claims, 10 Drawing Sheets

(56) References Cited

U.S. PATENT DOCUMENTS

2017/0228899 A1\* 8/2017 Witriol ................. G06T 11/001
2021/0136426 A1\* 5/2021 Mirmirani .......... H04N 21/4586

OTHER PUBLICATIONS

Al, et al., "Edge computing technologies for Internet of Things: a primer", In Journal of Digital Communications and Networks, vol. 4, Issue 2, Apr. 2018, pp. 77-86.
Muller, et al., "Context-Aware Proactive Content Caching With Service Differentiation in Wireless Networks", In Journal of IEEE Transactions on Wireless Communications, vol. 16, Issue 2, Feb. 2017, pp. 1024-1036.
"International Search Report and Written Opinion Issued in PCT Application No. PCT/US21/028040", dated Jul. 5, 2021, 15 Pages.

\* cited by examiner

RELIABLE DELIVERY OF DIGITAL SERVICES

CROSS-REFERENCE TO RELATED APPLICATION

The present application claims priority to Indian Patent Application IN 202041027906, filed Jun. 30, 2020, the entire disclosure of which is hereby incorporated by reference herein.

BACKGROUND

While more than half the world's population are Internet users, only a small percentage (14%) have access to broadband. For example, in India, access to broadband is limited to only 6% of the overall population today. But, about 500 million smart phone users (out of 1.4B) have access to 2G/3G/4G connectivity (about 300M urban and 200M rural). A large section of this population is accessing online content and services (e.g., mobile top-ups, travel bookings, insurance, etc.) indirectly and in an ad-hoc manner. Even this population has difficulty accessing the Internet enabled digital content directly from the cloud, which consumes a bulk amount of data and requires high network bandwidth. Today's content delivery network (CDN) and internet service provider (ISP) services are unable to meet the needs of this large, underserved population worldwide.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for content delivery comprises determining missing portions of received content delivered to a plurality of sub-edge devices and selecting one or more of the missing portions to recover. The computerized method further comprises selecting one of a satellite network or a non-satellite network, based on at least one of a content priority and weather, to recover the selected one or more missing portions. The computerized method also includes downloading the selected one or more missing portions from the selected one of the satellite network or the non-satellite network to recover the selected one or more missing portions, the recovery coordinated by a central cloud device communicating with the plurality of sub-edge devices.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

Figure 1:
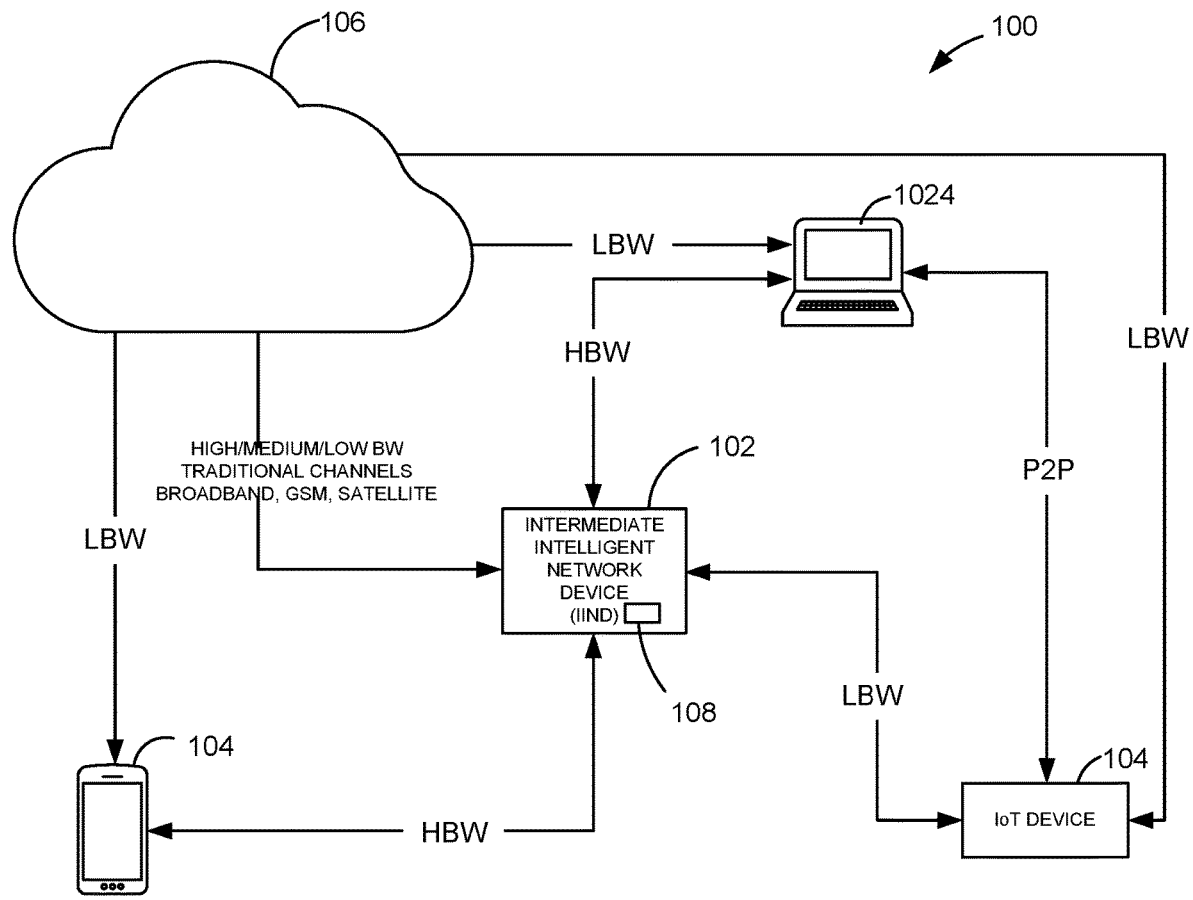
FIG. 1 is a block diagram illustrating as system according to an example.

The computing devices and methods described herein are configured to provide a context-aware and content-aware digital distribution network for optimally and reliably delivering Internet enabled digital services at the last mile (e.g., last hop before the user device), including by performing missing content recovery, particularly content communicated from one or more satellites. Various examples include a system subsuming an intermediate context-aware sub-edge device (e.g., computing devices at the last-mile edge of service) introduced between the cloud and end user device (e.g., consumer device at the edge), which leverages local storage and computation to thereby enhance overall end to end (E2E) network experience and/or performance for the end consumer. For example, reliable content delivery from a satellite to sub-edge devices is provided by introducing a context-aware configuration at the sub-edge coupled with both the cloud and end consumer device and using different recovery methods, such as non-satellite methods (e.g., a peer-to-peer (P2P) recovery method) and satellite methods. That is, a context-aware solution is provided at the sub-edge in various examples.

Sub-edge devices in one example have multiple network interfaces and a customized network stack to support the multiple network interfaces. Using contextual information (from the user, sub-edge, network, application, etc.), the content for the end user is preloaded on the sub-edge device. Instead of accessing content from the cloud, systems described herein allow the end user device to access the preloaded content directly from the sub-edge over a high bandwidth network.

A platform is provided for Internet enabled digital service businesses coordinated by a cloud service and augmented by a sub-edge configuration through properties of the sub-edge devices, including intelligence, storage, and computation, that optimizes the cloud to end user overall network utilization, cost, and performance, along with higher reliability. In one example, the sub-edge device hosts third party applications (e.g., Internet enabled digital service businesses). The third party applications at the sub-edge act as an intermediary between a corresponding end user and the cloud service.

As a result, the overall system is non-intrusive to the end user, and utilizes contextual information and network bandwidth diversity in content acquisition and delivery. The overall system further performs missing content recovery to enhance overall E2E network performance. For example, content recovery is enabled at the sub-edge device as well as at the end user device. Buffered multicast of content is provided directly from the sub-edge to the end user devices. End users also can access different parts of the same content from multiple sub-edges. In this manner, when a processor is programmed to perform the operations described herein, the processor is used in an unconventional way that allows for more efficient and reliable content delivery, which results in an improved user experience.

The present disclosure solves at least one or more of the following technical problems:
- Even if the cloud and corresponding intermediate infrastructure is well equipped, the end consumer device can only access a low bandwidth network connection due to high cost or the paucity of infrastructure at the last mile. This, in turn, exacerbates the E2E network performance from the end consumer perspective.
- Although infrastructures like the content delivery network (CDN) attempt to ameliorate the situation, the infrastructures are not comprehensively empowered by the very specific contextual information at the end user level. As a result, the Internet enabled bulk content do not optimize network utilization cost.
- The infrastructure needs to be extended to reach as close as possible to the end user, which is currently unavailable.
- In a satellite content delivery environment, all ground sub-edge devices in a geographic area (e.g., city) should have the same content. However, error rates from different satellites are different, so some sub-edge devices will have different content portions missing than other sub-edge devices.

In a satellite content delivery environment, the sub-edge devices of the present disclosure in the same geographic area perform content recovery for the missing portions using satellite or non-satellite networks (e.g., TV White Space (TVWS), Ethernet, cellular, cloud, etc.). In some examples, the sub-edge devices receive most of the content from the satellites, with the missing content recovered via the non-satellite networks.

An architecture of a system 100 according to one example is shown in FIG. 1. The system 100 in this example has an intermediate context aware sub-edge device (between the cloud 106 and an end user device 104), which has multiple network interfaces and a customized network stack. By introducing an intelligent intermediate network device (IIND) 102 at the last hop between the end user device 104 (e.g., mobile phone, an Internet of Things (IoT) device) and the cloud 106, a tiered architecture is provided that improves overall network performance and/or the end user experience. The tiered architecture helps ensure reliable content delivery from satellites at least by performing "intelligent" recovery of missing content. In the various examples, the IIND 102 is configured or embodied or referred to as a hub device or a sub-edge device. For example, as illustrated in FIGS. 2-7, the IIND 102 is a sub-edge device embodied as a blended intelligent network (bine) hub 302.

With particular reference to the IIND 102, this device is configured in various examples as next described. The IIND 102 is a highly reliable sub-edge device with local storage and compute that runs PaaS software. The IIND 102 hosts multiple network interfaces with the cloud 106 both unidirectional as well as bi-directional, but has at least one channel that is bi-directional with the cloud. Possible network channels include Digital Subscriber Line (DSL), Global System for Mobile Communications (GSM), Long-Term Evolution (LTE), LTE-B, satellite downlink, television whitespace (TVWS), etc. The IIND 102 can establish bi-directional communication with any other IIND devices over WAN/long-range WiFi/Local Area Network (LAN)/TVWS etc. if the devices are running the PaaS software.

After content is delivered to the IIND 102, the IIND 102 performs recovery for any missing portions of the content using satellite or non-satellite networks, including the network channels described above. Recovery is performed in multiple ways based on, for example, cost, efficiency, and time, including recovery at the IIND 102 using, for example, a low bandwidth (LBW) link, peer-to-peer recovery among other IINDs in the same geographic area (e.g., using television white space (TVWS)), and recovery in the end user device 104.

Other end user devices like smartphones, laptops, IoT devices can connect with the IIND 102 and establish bi-directional communication channels over 802.11 a/b/g/n, Bluetooth, NFC, TV Whitespaces etc. To communicate in this architecture, the end user device applications are configured to interact with a version of the PaaS software, which is available in the form of software development kit (SDK), library, or service, and hence can also be added to existing applications.

The end user devices 104 have separate 'private' channels with the cloud 106 for exchanging sensitive and/or private information with low data exchange requirements such as authentication, financial information, device specific actions etc. The end user devices 104 establish P2P communication and exchange any data after consent to do so is acquired from either the IIND 102 or the cloud 106. In some examples, the 'private' channels are communication channels having a low-bandwidth connection (e.g., second generation (2G) or third generation (3G) cellular network connections). In one example, a majority of or most of the 'private' channels (e.g., more than 90 percent) have a low-bandwidth connection. However, it should be appreciated that the number of 'private' channels that have a low-bandwidth connection can be higher or lower.

Figure 2:
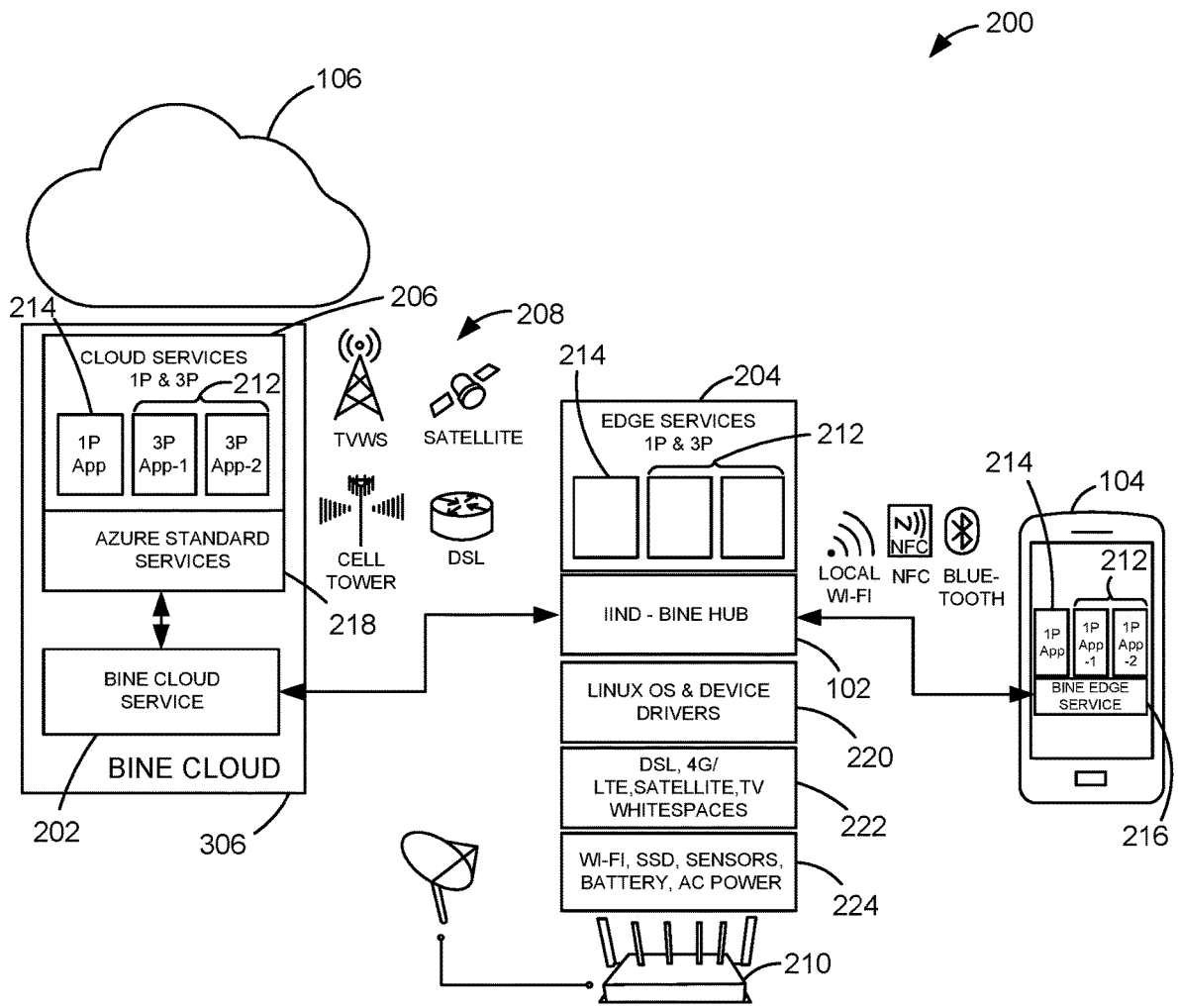
FIG. 2 is a block diagram of a platform as a service (PaaS) system according to an example.

An architecture of a platform 200 (as a PaaS) according to one example is shown in FIG. 2. The PaaS 200 is configured in various examples includes a central cloud device (configured or referred to in some examples as a bine cloud 306, shown in FIG. 3) and providing a cloud service 202 (configured or referred to in some examples as a bine cloud service that controls cloud operations) between edge services 204 and cloud services 206. That is, the PaaS 200 is configured as a platform that includes both the cloud and the sub-edge. In this example, the bine cloud 306 coordinates and controls operations between the edge services 204 and cloud services 206, including content delivery from a plurality of communication devices 208, which includes performing recovery of missing content. In one example, the edge services 204 in combination with the IIND 102 are configured to control communication between the cloud service 202 and the end user device 104, including to recover missing content from a different communication device 210. For example, most of the content is received from one of the communication devices 208, such as a satellite, and the missing content is received from the communication device 210, such as via Ethernet, DSL, GSM, etc.

In the illustrated example, the IIND 102, apart from multiple network interfaces, has both local storage and computation power to maintain state, parameters, and host other applications. The IIND 102 can have a range of storage and computational capabilities that depend on various factors, such as location, demography, use-cases (personal versus commercial) etc., but runs a bine hub application to leverage functionalities. The IIND 102 is also configured to access one or more drivers 220 and communication interfaces 222 to allow communication through different means, such as the communication device 210. Storage and power 224 are also provided.

In one example, the cloud services 206 in combination with the bine cloud service 202 (and access to standard services 218) run in a particular cloud, manage the hubs (e.g., one or more IINDs 102), and orchestrate tasks and actions for the overall system. For example, the IIND 102 runs the bine hub application that monitors storage and computational resource availability, and is also responsible for decision-making at the 'last hop'. The bine hub application is configured in a manner to allow other providers to run third-party (3P) applications 212 apart from any first party (1P) applications 214 that leverage the bine hub storage, compute, and intelligence. The IIND 102 downloads, maintains, and updates machine learning models on the hub device for both the 1P applications 214 and 3P applications 212, which run on the IIND 102 (e.g., run on the bine hub). The bine edge is the service component 216 that runs on the end user device 104 and that interacts with both the bine cloud service and the bine hub seamlessly to provide improved digital service delivery, including initial delivery and recovery of missing content.

Figure 3:
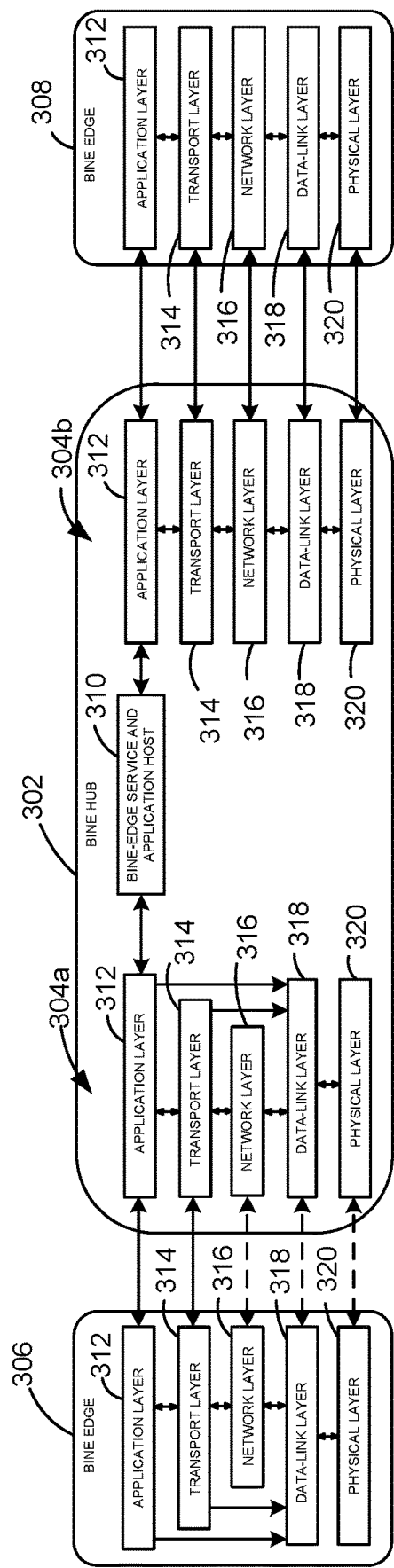
FIG. 3 is a block diagram of a blended intelligent network (bine) network stack according to an example.

An example of a bine network stack 300 is illustrated in FIG. 3. The bine network stack 300 is configured in various examples to include two different network stacks 304, one stack 304a for communicating with the bine cloud 306 and other bine hubs 302, and another stack 304b for communicating with the bine edge 308 service. As described herein, in various examples, the bine cloud 306 executes the cloud service 202 and the bine edge 308 is a service executing on the end user device 104. That is, the cloud service 202 operates on the cloud side of the 'bine' and the end user device 104 operates on the user device side of the 'bine'.

The two network stacks 304a, 304b are bridged by the bine hub service and host 310 at an application layer 312, such that all the PaaS clients are hosted therein, corresponding services are provided, and local storage and computation is performed. In some examples, the bine hub service and host 310 include, or are embodied as, the edge services 204.

The cross-layer network stack illustrated in FIG. 3 facilitates multiple network interfaces, wherein the application layer 312 determines/selects the network interface before initiating a communication, and a transport layer 314 handles run-time vertical handover to ensure better network performance. It should be noted that the network stacks, including the network stacks 304a, 304b, have other layers including a network layer 316, a data-link layer 318, and a physical layer 320. That is, the network stacks in various examples can be configured using one or more different network communication protocol designs.

Thus, in some examples, two five-layer network stacks 304 are configured in the bine hub 302 with the network stack 304a configured to communicate with the bine cloud 306 (cross-layer customization to support multiple interfaces—preselected or on the fly) or other bine hubs 302. The network stack 304b is configured to communicate with end devices (standard stack). The stacks 304 are bridged at the application layer 312.

One or more examples include local storage, wherein the bine hub PaaS platform provides features where a storage 108 of the bine hub 302 is leveraged by other applications for a specified duration. In a 'Leaf CDN' example, a media company (MC) is launching a new season of popular television series S_1 in a specific region. Each user opens a new unicast channel for accessing the content. MC can make the content available to the bine cloud 306 via API's. The bine cloud 306 delivers S_1 to specific hub locations, including content recovery as described herein. Users in nearby locations using an MC application integrated with the bine edge 308 receive notifications prompting the users to get files from the nearest hub in high quality at high speed without incurring any data cost. The user can then acquire the content without hitting cloud CDN's of the MC.

In a 'Temporary Personalized Secure Storage' example, a typical end user who does not have access to a high bandwidth (HBW) connection and a lot of local storage can request delivery of any content to a specific hub. Using the bine edge 308, the user of the API can communicate the specific file, duration, and specific hub to which the content needs to be delivered. A download operation is triggered at the specified hub, and after download (including content recovery as described herein), the content is encrypted and stored for a specified duration. The content is only accessible by the user via the specific end user device 104 that triggered the request.

Figure 4:
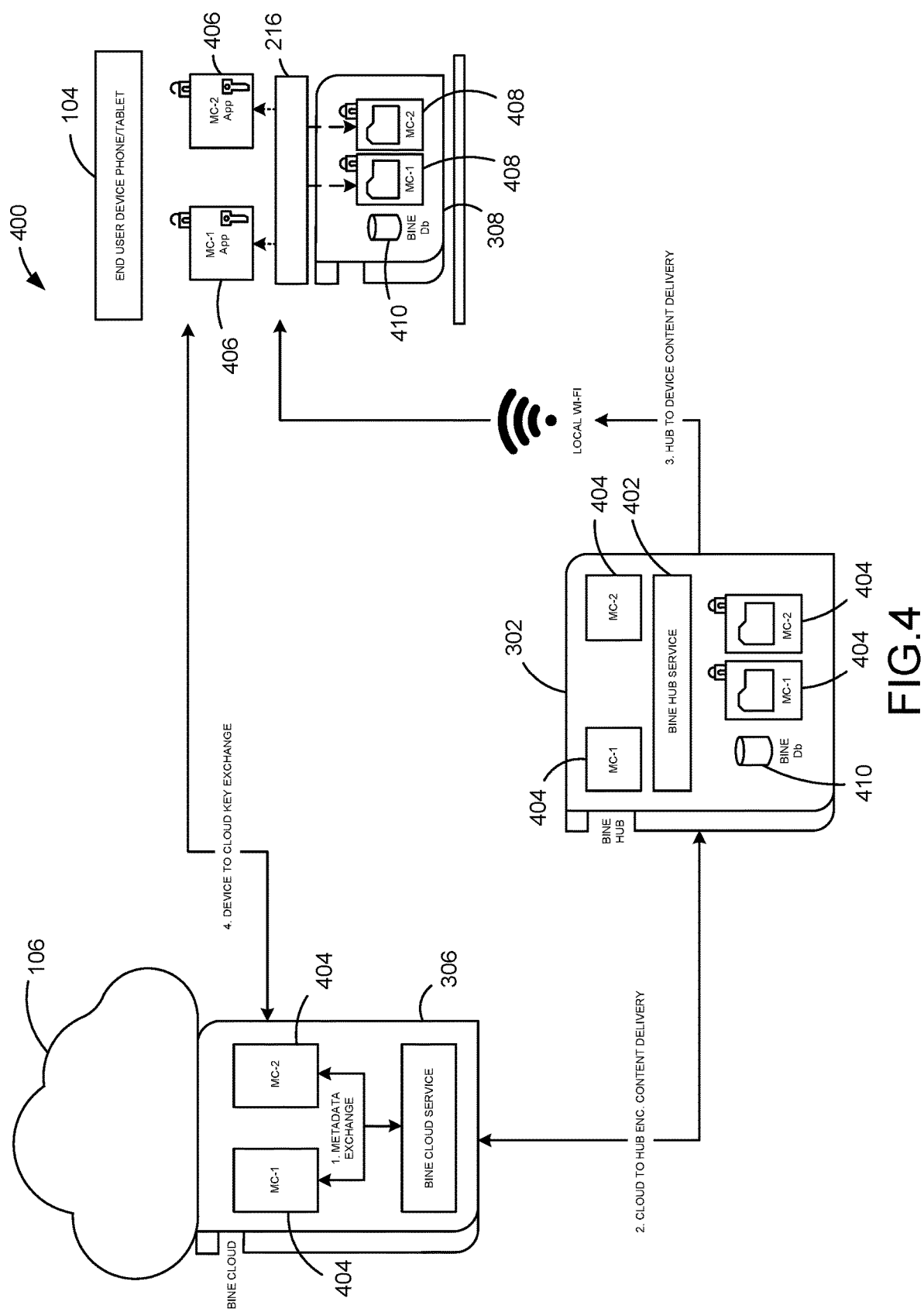
FIG. 4 is a block diagram of content delivery network according to an example.

An architecture of a CDN 400, illustrated as a leaf CDN, according to one example is shown in FIG. 4. With continued reference to FIG. 3, various examples leverage the sub-edge and the CDN. In an example, the bine cloud 306 uses control messages and telemetry from the bine hub 302 to make decisions on appropriate delivery channels. The bine hub PaaS platform has a machine learning (ML) module that is a collection of several models that are downloaded and updated and made available for different end application uses. The ML models are both for specific use cases of the 3P applications 212 and facilitate bine hub services 402. The bine hub 302 ensures that any 1P application 214 or 3P application 212 that runs and stores data on the platform conforms to policies deployed on the hub. The policies are application specific and encapsulate user consent, data retention and deletion, sharing etc. The ML models can be deployed on the bine hub 302 by both 1P and 3P applications along with a custom policy around updates, data-use, etc. The bine hub 302 has the ability to maintain sovereignty of data 404 (e.g., data of the MC), which may be stored in a bine database 410, by running ML models only on the bine hub 302 and not pushing user data to the cloud 106. Anonymized and aggregated data can be shared with 3P services based on policies in place to improve the ML models.

In some examples, metadata is used to determine content to download to the bine hub 302. A key 406 is used to access the content 408 by the end user device 104 (to leverage storage at the bine hub 302). It should be noted that diversity of channels provides increased communication speed (e.g., select the fastest channel). In an example for enhancing a video experience using ML, an MC has developed ML models that can enhance the user experience of watching videos in real-time by upscaling the videos. The ML models are trained on the videos apriori and different types of videos have different types of models. For example, a sports movie model is different from a talk show model. Also, the ML models use specific hardware for the models to run effectively. The MC can attach ML models with specific content to be delivered to the bine hubs 302. Whenever a user acquires specific content, the bine hub 302 and the bine edge 308 coordinate to either push the content with ML models to the end user device 104 or upscale the video and push that content directly to the end user device 104 depending on device specifications.

Figure 5:
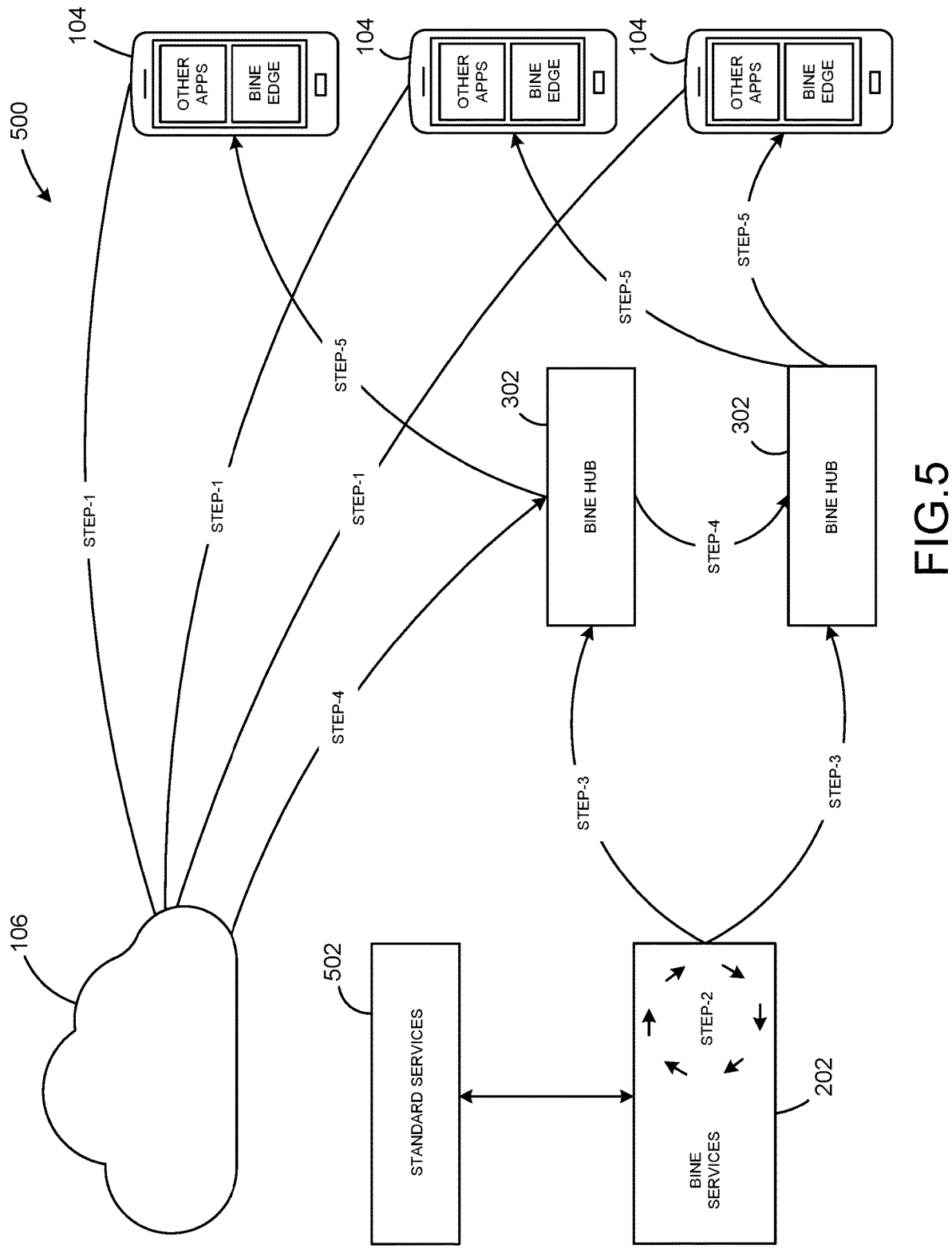
FIG. 5 is a block diagram illustrating a workflow for intelligent content acquisition and delivery according to an example.

FIG. 5 illustrates a workflow 500 for intelligent content acquisition and delivery according to an example. The workflow 500 in this example includes the following operations:

Operation 1: User operating the end user device 104 demands aggregation;

Operation 2: Network interface selection by the bine cloud service 202, which can access standard services 502;

Operation 3: Delivery to the bine hub 302 (e.g., via satellite means);

Operation 4: Recovery and store in the bine-hub 302 (e.g., via non-satellite means); and Operation 5: Delivery to the end user device 104.

It should be appreciated that the operations can be performed in a different order, additional or fewer operations may be provided, and operations can be performed at the same or different times (e.g., simultaneously, concurrently, or sequentially).

Figure 6:
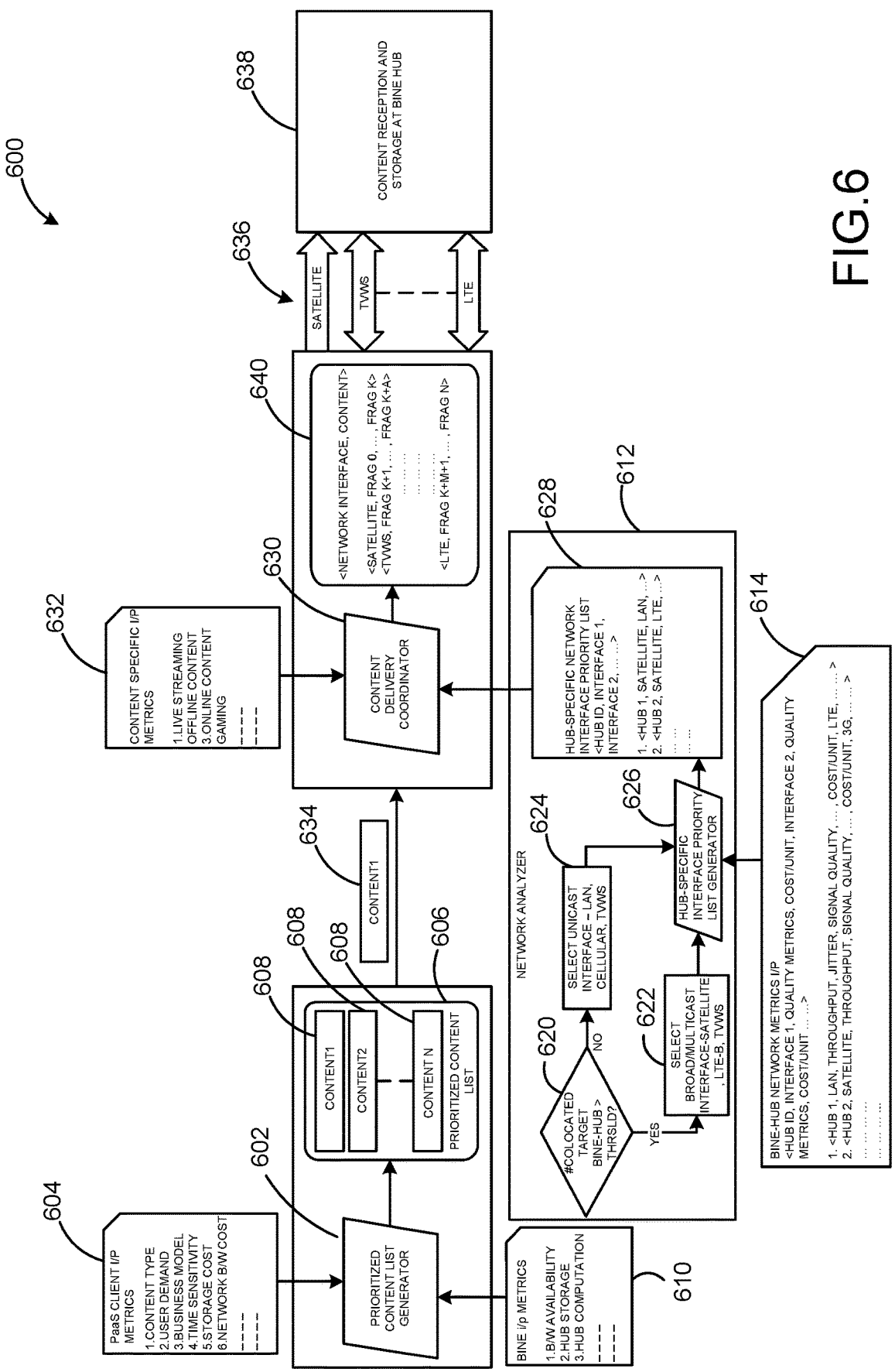
FIG. 6 is block diagram illustrating a process for content acquisition and delivery according to an example.

FIG. 6 illustrates a process 600 for content acquisition and delivery according to an example. The process 600 performs intelligent content acquisition and delivery. A prioritized content list generator 602 in the bine cloud 306 generates a content acquisition priority (e.g., a prioritized content list 606 including a plurality of content 608) based on one of more metrics 604 (e.g., PaaS client metrics, such as content type, end user demand, business model/promotion, time sensitivity, storage cost, network bandwidth cost, etc.) provided by the PaaS client and bine services. The metrics 604 can vary from bine hub 302 to bine hub 302 depending on, for example, geographic location, demography of user community, etc. In one example, computational metrics 610 (e.g., metrics of storage and network bandwidth, among others) are also considered.

Content acquisition is then handled by the bine service in two high-level operations. This acquisition includes (1) a network analyzer 612 making decisions on using a particular network interface to obtain content from the cloud 106 and (2) performing a recovery and storing the content.

The network analyzer 612 is configured to make decisions on using the network interface to acquire the content from the cloud 106 depending on one or more network metrics 614 (e.g., network bandwidth utilization, quality, and cost). For example, if the same content is requested by multiple bine hubs 302, a satellite broadcast is performed in consideration of bandwidth utilization and cost. However, depending on the weather, the satellite broadcast can be hampered. In such cases, the network quality is a factor depending on the network quality forecast or run-time network analysis. Another example is cellular network quality at the location of the bine hub 302 based on the distance of the cellular tower, antenna gain, loss of signal (LOS), etc. In the initial stage, the network metrics 614 are determined and analyzed based on a heuristic. However, ML is utilized in some examples in determining and analyzing optimal metrics over time.

In the illustrated example, the network analyzer 612 determines at 620 whether a target bine hub 302 is able to operate above a threshold, for example, based on the network metrics 614, and/or other metrics. If operation above the threshold is possible, a broadcast or multicast interface is used to broadcast or multicast the content at 622 (e.g., satellite communication). If operation is below the threshold, then a unicast interface is used to unicast the content at 624 (e.g., LAN or cellular communication). A hub-specific interface priority list generator 626 then generates a hub-specific interface priority list 628 based on the selected communication method and bine hub network metrics.

A content delivery coordinator 630 then uses content specific metrics 632 or 'content metrics' (e.g., live streaming, offline content, online content, gaming, etc.) to deliver the content 634 via a network interface 640 based on the hub-specific interface priority list 628. For example, a network interface 636 (e.g., satellite, TVWS, cellular CTE, etc.) is used to transmit the content 634 to the bine hub 302 wherein content reception and storage 638 is performed. Thus, in some examples, content type also can be a factor. For example, for a live streaming content, network quality gets the highest priority as the scope of recovery is very little. On the other hand, offline content gets more acquisition and recovery time. Another consideration is allowable latency for content. For example, gaming requires the lowest possible latency in some examples. Thus, in various examples, intelligent content acquisition and delivery are provided.

The network interface from the cloud 106 to bine hubs 302 is selected by running the network analyzer 612, which can include a determination of whether the transmission is multicast or broadcast. In some examples, bine hub network metrics (e.g., quality, cost, etc.) are used to determine a list of switchable network interfaces for each bine hub 302 with a determination of the type of content. The content delivery coordinator 630 then runs an algorithm to coordinate content delivery (it should be noted that fragments can be sent over different channels, which can be different for different bine hubs 302). Content is delivered to the bine hubs, recovery is performed, and the content is stored in the bine hub. A notification is then provided to the PaaS client of this storage of the content. For example, the PaaS client notifies the end client when the content is stored.

Figure 7:
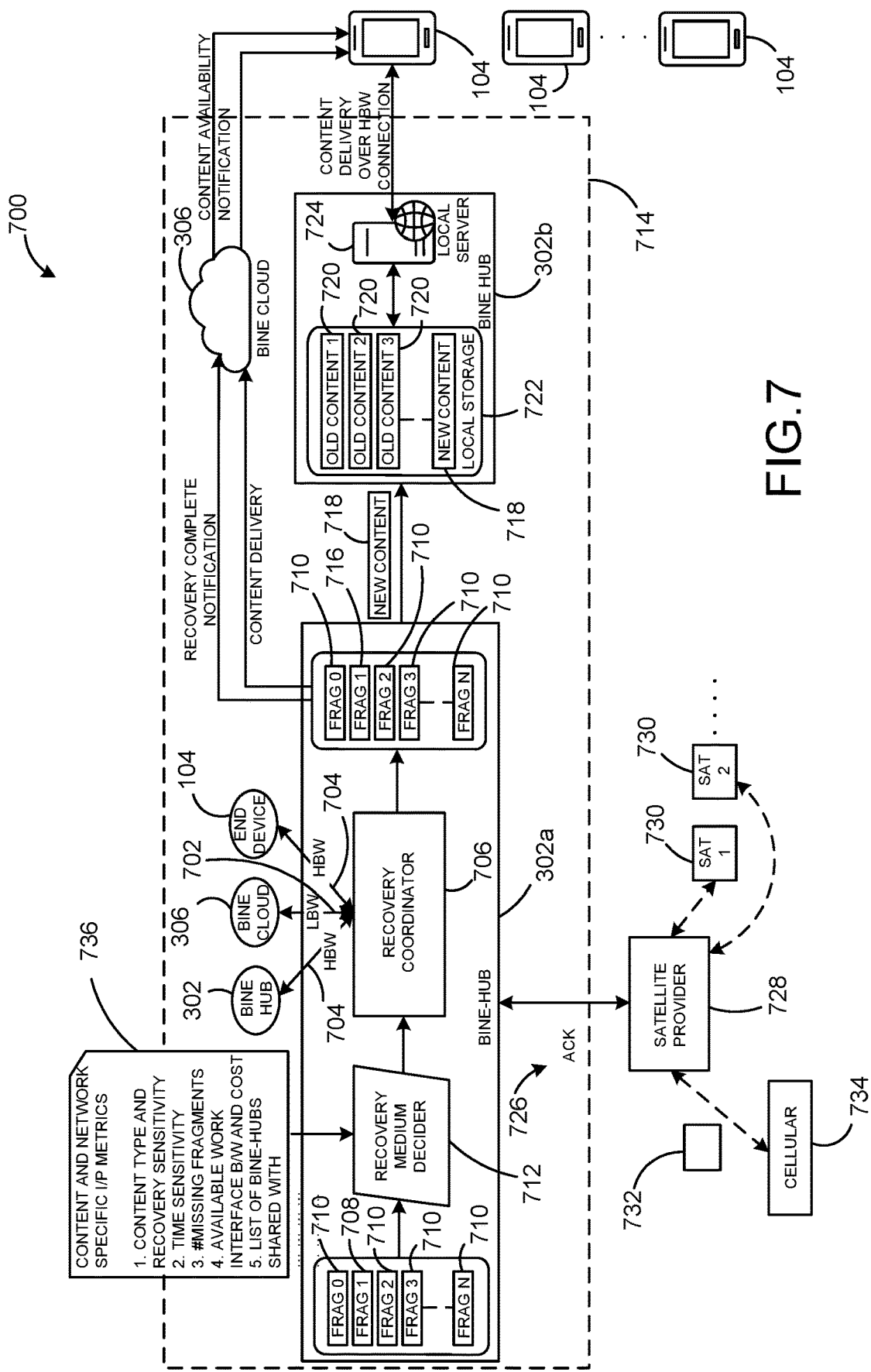
FIG. 7 is block diagram illustrating a process for content acquisition and delivery according to another example.

FIG. 7 illustrates a process 700 for content acquisition and delivery. The process 700 performs intelligent content acquisition and delivery that includes recovery of missing portions of content. In one example, the process 700 provides reliable content delivery from a satellite to sub-edge devices by introducing a context-aware device (bine hub 302) at the sub-edge coupled with both the cloud 106 and the end user device 104, and using one or more recovery methods. That is, all sub-edge devices (e.g. all the bine hubs 302) in a geographic area (e.g., city) should have the same content. However, error rates from different satellites differ, so some sub-edge devices will have missing content portions, and those missing portions may differ among sub-edge devices. As part of the process 700, the sub-edge devices in the same geographic area perform recovery for the missing portions using non-satellite networks. As such, in this satellite example, the sub-edge devices will then have received most of the content from one or more satellites, with the missing content recovered via non-satellite means. However, in some examples, content recovery may also be performed using satellite means (e.g., recovery of low priority content).

With particular reference to FIG. 7, after content acquisition is performed as described herein (see, e.g., FIG. 6), recovery can be performed, such as when the bine hub 302 misses some part or portion of the content for various reasons. It should be noted that recovery is coordinated by the bine cloud 306, in some examples. In various examples, the recovery can be performed using non-satellite means (e.g., using a P2P connection between the bine hubs 306, using the cloud 106, using a cellular network, etc.) or satellite means (e.g., using one or more orbiting satellites).

More particularly, once the content reaches the bine hub 302, and it is determined that some content is missing, recovery is performed. The recovered content is then delivered to the end user devices 104 by the bine hub 302. The delivery of content is performed using the HBW network interface between the end user device 104 and the bine hub 302 (e.g., using a HBW connection 704). The HBW network connection and the intelligent delivery system improves the end user experience by enabling high throughput.

In one example, a recovery coordinator 706 is configured to perform content recovery of a missing content fragment 708 among received content fragments 710. A medium recovery decider 712 uses content specific metrics 632 and/or network specific metrics 736 (or 'network metrics') (e.g., content type and recovery sensitivity, time sensitivity, a number of missing content fragments 708, available network interface bandwidth and cost, available bine hubs 302, etc.) to coordinate or control the recovery process, such as to select and/or download one or more missing portions of the missing content to recover. As such, the recovery coordinator 706 is configured to perform content recovery in multiple ways based on cost, efficiency, and time (e.g., based on available bandwidth, the speed of the connection, etc.), with different recovery interfaces including (i) at the bine hub 302 using the LBW connection 702 (with the bine cloud 306), (ii) P2P recovery among the bine hubs 302a, 302b (e.g., using television white space (TVWS)), and (iii) recovery in the end user device 104. Recoveries are coordinated by the bine cloud 306 over the LBW connection 702. For example, the bine cloud 306 receives telemetry data from the bine hubs 302a, 302b and selects which connection(s) to use to provide the missing content portions. After recovery, the content is stored depending on the content type, storage size/cost, content demand, etc. as described herein. As described in more detail, the content recovery, including the coordination of the content recovery, is performed at least in part using one or more heatmaps 802 (shown in FIG. 8). For example, the bine cloud 306 creates or generates one or more heatmaps 802 of missing content at the bine-hub level based on information shared by the bine hubs 302. In this way, the recovery of the missing content (e.g., connections to use, size of the recovery zone 714, recovery scheme used, etc.) is controlled and/or coordinated based on heatmaps 802 (shown in FIG. 8) created from information shared among the bine hubs 302. Moreover, the parameters and/or methods for performing the content recovery are based at least in part on the heatmaps 802.

In one example, the user can download different parts of the same content from different bine hubs 302 at different locations and different times. The end user device 104 can perform the recovery of the missing fragments 708 in content received from one bine hub (e.g., bine hub 302a) through another bine hub (e.g., bine hub 302b) at different locations. Also, end user devices 104 connecting to different bine hubs 302 can determine if missing fragments 708 are at the other bine hubs 302.

Thus, the determination of whether and how to perform recovery can be based on different factors, such as time sensitivity, the number of missing fragments and what network interfaces are available. It should be noted that some content portions (e.g., missing content fragment 708) may be missing from all sub-edge devices. In one example, an acknowledgement 726 is sent to a satellite provider 728, which then communicates to one or more satellites 730 to send that missing content to all the sub-edge devices on the next orbit of the one or more satellites 730. Alternatively, the acknowledgement 726 is sent to the satellite provider 728, which then packages up the missing content 732 for transmission from another network (non-satellite network), such as a cellular network 734 (e.g., for 5G broadband transmission to the sub-edge devices).

In the above configuration, a multihoming system is defined. It should be noted that although the multihoming system is described in connection with cellular and satellite content delivery, other communication and data delivery networks can be used. Transmission in the multihoming system configuration can also be based on different factors, such as time and content sensitivity/priority. In some examples, weather is used as a factor, such as using predicted weather to determine time windows for content delivery, recovery, and download. For example. satellite signal strength can be estimated based on predicted weather conditions, such that high priority content is scheduled for delivery during higher signal strength conditions.

Variations and modifications are contemplated. In one example, the satellites 730 are low earth orbit (LEO) satellites, and the sub-edge devices have an antenna with a controllable motor to aim the antenna at one or more of the LEO satellites as they pass overhead. In another example, as signal strength varies, and using geographic location information for the sub-edge devices (e.g., cellular or GPS location information), the type or amount of content that is sent can be adjusted. In another example, the location of the sub-edge devices are known, and the content is prioritized, such that the most important or highest priority content is sent where signal strength is expected to be the best at the sub-edge devices.

Thus, as can be seen in the process 700 illustrated in FIG. 7, the missing content fragment (Frag 1) is recovered as a content fragment (Frag 1) 716, which can be transmitted from the bine hub 302a that recovered the missing content to the bine hub 302b as new content 718 in a recovery process. The new content 718 is stored with old content 720 (e.g., previously received content fragments 710) in a local storage 722 of the bine hub 302b.

The content, including the recovered content, also can be accessed by the end user devices 104 from the bine hub 302a through the bine cloud 306 (e.g., after receiving a recovery complete notification, which is also communicated to the end user devices 104) or through a local server 724 from the bine hub 302b.

Alternatively or in addition, the missing content, which becomes recovered content, in some examples, is communicated directly to the end user devices 104. In some examples, depending on the priority of the content, etc., the missing content can be transmitted to the end user devices 104 by the one or more satellites 730 or the cellular network 734.

Figure 8:
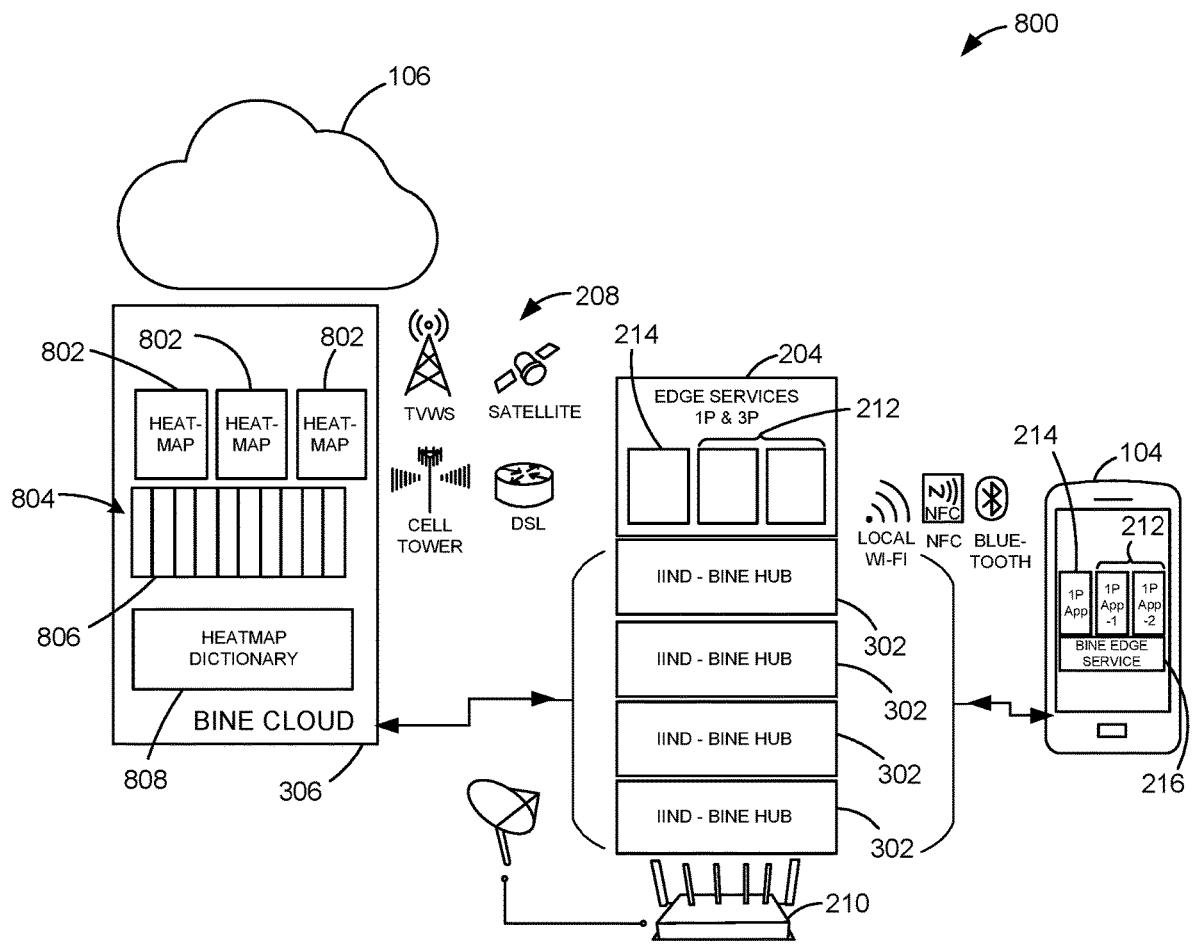
FIG. 8 is a block diagram illustrating content recovery using heatmaps according to an example.

In one example, a recovery zone 714 defines a group of sub-edge devices (e.g., bine hubs 302) that participate in the recovery scheme described herein (see FIG. 8 illustrating content discovery and recovery scheme selection performed in one example). The recovery zone 714 in some examples is defined as a geographic area, an area defined by device latency, or an area defined by other factor to identify a group of bine hubs 302 that participate in the content recovery. For example, inclusion in the recovery zone 714 is defined by a latency among the sub-edge devices, or a latency among the end user devices 104. Devices with latencies less than a defined or threshold amount (e.g., value) are part of the recovery zone 714. This allows for the selection of bine hubs 302 to participate in the recovery. However, it should be appreciated that other factors or criteria can be used to define the recovery zone 714. It should also be noted that the recovery zone 714 is dynamically configurable. That is, in some examples, the size of the recovery zone 714 dynamically changes, such as based on predicted weather and/or the actual weather being experienced (e.g., increase or decrease the composition or size of the recovery zone 714, such as the number of bine hubs 302). For example, the quantity of devices in the recovery zone 714 decreases during good weather.

The system in some examples also leverages weather predictions for arranging content recovery. For example, the system prioritizes the missing content, such that once the system knows the locations of the sub-edge device (or the end user devices 104), and once an expected signal strength is known (e.g., based on weather, orbit, etc.), the most important/highest priority content that is missing is then sent to the sub-edge device (or the end user devices 104) when the signal strength is expected to be the best.

As another example, if the content is a new popular TV series streamed by an MC, which is a PaaS client, depending on the user demand aggregated in the bine cloud 306, the MC can store the TV series beforehand in the bine hubs 302. If there is high user demand of the content across different geographic locations, in one example, the bine cloud 306 decides to use satellite broadcast for delivering the content to multiple bine hubs 302, which reduces the bandwidth utilization and cost. After receiving the content, each bine hub 302 starts recovery if there are any errors during the reception. In one example, a first attempt is P2P recovery among the bine hubs 302. Next, recovery is attempted from the cloud 106 using either the LBW connection 702 or the HBW connection 704 depending on the amount of recovery needed, or using other methods as described herein. After the recovery is completed, the recovered content is stored in the local storage of the bine hub 302 with an expiry date predicting the decreasing user demand over the time.

Once the content is stored, the bine cloud notifies the corresponding MC about the content availability in the bine hub 302. The MC then notifies the end user in the corresponding region where the bine hubs 302 are deployed. The end user then can obtain the content downloaded/streamed to the end user device 104 of the user through the HBW connection 704 with the bine hub(s) 302. As the content is locally stored in the bine hub(s) 302, the content does not have to be obtained or fetched from the cloud 106 for the demand by different end users at different times, which in turn, increases the throughput, as well as the end user experience. It should be noted that in contrast to a router, the present disclosure stores the content in the bine hub 302.

With respect to content recovery, FIG. 8 illustrates a content recovery scheme 800 in one example to recover missing content. In this example (and with continued reference to FIG. 7), the plurality of heat maps 802 are used when performing content recovery, including to facilitate coordination of the recovery, as well as to define different recovery parameters, such as the creation and adjustment of the recovery zone 712, the method of recovery, etc.

In the illustrated example, the bine cloud 306 creates or generates one or more heatmaps 802 of missing content at the bine hub level based on the information shared by the IINDs (illustrated as the bine hubs 302). Different designations or indicators of the level of missing content are contemplated, such as when the heatmap is more red, more segments 806 of the content 804 is missing. As can be seen, the complete content 804 is divided into the multiple segments 806 (which correspond to the content fragments 710 in one example), and the heatmap 802 is created for each segment 806 of the content 804. It should be noted that the smaller the size of the segment 806 (corresponding to the illustrated width of the segments 806), the larger the overall heatmap 802, which has more precise information. On the other hand, the larger heatmap 802 requires higher bandwidth while sharing the heatmap 802 with the bine hubs 302 from the cloud 106.

A segment 806 can have multiple data chunks and the segments 806 can be of the same or different sizes (i.e., the amount of data in each segment 806 can be the same or different). It should be noted that a data chunk 'missed' from a segment 806 is considered as a missing segment (e.g., the missing content fragment 708). The formula or determination for the content segmentation is defined in the bine hub 302 and the bine cloud 306. In some examples, the heatmap 802 is created for popular content that was broadcast to multiple bine hubs 306 in a region, and as discussed herein, content is selected based on aggregated user demand.

In one particular example, the bine cloud 306 is configured to analyze one or more of the heatmaps 802 and select a recovery method based on the analysis, for example, whether to use satellite recovery or non-satellite recovery. If a defined number of bine hubs 302 (e.g. above a threshold amount) in a region is 'red' for a defined number of segments 806 (e.g., above a threshold amount, such as a significant number of segments), the recovery is performed using a satellite broadcast given the time sensitivity of the content and the period of satellite. For example, if a large number of bine hubs 302 in the region have red colored segments 806, indicating a large amount of missing data, satellite recovery of the missing data is performed as discussed herein. Such a condition can occur, for example, when the weather is bad in a particular region during the satellite broadcast. As a result, there is greater likelihood that the bine hubs 306 in that region will miss multiple segments 806 of content from satellite broadcast. However, it should be noted that other factors may be determinative, such as the size of the region and the number of bine hubs 306 in the region. In some examples, the default selection is to first perform local recovery.

To perform content recovery in some examples, each bine cloud 306 shares the following information with one or more other bine hubs 302 after the decision making is completed using a reliable non-satellite network: satellite or local recovery for the bine hub 302, and if local recovery is selected and/or recommended based on the analysis, the bine cloud 306 shares a heatmap dictionary 808 of missing content and timeout information for the local recovery. It should be noted that the bine cloud 306 does not share any recovery method related information with the bine hubs 302, in some examples. With the above discussed information, local recovery can be performed in different ways.

In one example of local recovery, after receiving the heatmap dictionary 808 (identifying the missing content), which can also include instructions for local recovery, each bine hub 302 prepares for content sharing with other bine hubs 302 in the local network (e.g., within the recovery zone 714). Depending on the availability of infrastructure, the local network can be, for example, a TVWS network, long-range WiFi network using directional antenna, and/or LAN over the ethernet.

From the heatmap dictionary 808, each bine hub 302 is able to determine the missing segments 806 of the content 804 in other bine hubs 302 in the local network. It should be noted that the bine hub 302 does not send any requests to other bine hubs 302 in the local network for sharing the missing content because each bine hub 306 already has the heatmap dictionary 808. If a bine hub 302 has the segments 806 that are missing in other bine hubs 302, the bine hub 302 starts multicasting the segments 806 over the local network.

As another example of local recovery, content can flow at a multi-hop level in one or multiple local networks over one or multiple network interfaces. The bine hub 302 can be a part of multiple local networks. For example, in the case of a TVWS (or long-range Wi-Fi) network, the local network of the bine hub 302 is formed to include other bine hubs 302 within the antenna coverage of the bine hub 302. In such case, the bine hub 302 can be connected to multiple local networks that can form a mesh network. Also, the bine hub 302 can be part of multiple distinct local networks over different network interfaces.

After receiving a missing segment 806 of the content 804 from one or more bine hubs 302 in the local network, the bine hub 302 checks whether there is another local network where the sender bine hub 302 is not present, and forwards the newly received part of the content 804 (e.g., one or more segments 806) to that local network if any bine hub 302 has missed that part according to, or as determined from, the heatmap dictionary 808. As part of recovering content from other bine hubs 302, mobile applications (e.g. the applications 212 and 214) that run on 'bine-edge' can also assist in content recovery. For example, when an end consumer application running the 'bine-edge' comes into proximity or the vicinity of the bine hub 302, the end user device 104 running one or more of the mobile applications connects over the local bine hub network. Then, after an initial handshake between the bine hub 302 and the end user device 104, the content availability and/or missing matrix (e.g., segments 806 still missing) is shared. If the end user device 104 has any data chunks of content that the bine hub 302 is missing (e.g., any of the still missing segments 806 of the content 804), data transfer is initiated over the local network, such as Bluetooth, Wi-Fi or NFC, while the end user device 104 is still in proximity or vicinity to the bine hub 302 (such that communication is still possible). In one example, the bine hub 302 communicates these 'events' to the bine cloud 306, which updates one or more corresponding heat maps 802 and the now transmitted missing segments 806 are made available for further distribution, such as to other bine hubs 302.

In some examples, local recovery is expedited through global data injection. For example, during the local recovery, the bine cloud 306 also injects missing content to one or more selected bine hubs 302 over a non-satellite global network. In one particular example, based on the heatmap 808, the bine cloud 306 selects one or more bine hubs 302 for injecting missing content (e.g., inserting the missing segments 806 into the rest of the content 804 to complete the content) directly from the cloud 106 which then can be shared with other bine hubs 302 over the local network. This implementation makes the local recovery faster, but at a cost of higher global bandwidth. Hence, in one example, the bine hub 302 attempts to optimize the global bandwidth utilization cost by minimizing the number of selected bine hubs 302 for missing content injection from the cloud 106 and maximizing the local connectivity coverage of the selected bine hubs 302. In one example, the local connectivity coverage of the selected bine hubs 302 is measured based on the number of other bine hubs 302 to which the bine hub 302 is connected and that are missing one or more segments 806 of the content 804.

It should be noted that post recovery, in some examples, after a recovery timeout period (e.g., a defined time period after the recovery operation is completed), the bine cloud 306 prepares one or more new heatmaps 802 aggregating the latest status of missing content from the bine hubs 302. Based on the updated heatmap 802, the bine cloud 306 then performs additional analysis or decision making as to whether further recovery is to be performed. If further recovery is to be performed, this recovery can be performed using satellite or non-satellite recovery methods as described herein. It should be noted that in some examples, time sensitivity of the content 804 gets the highest priority in a condition where further recovery is performed and followed by a number of the bine hubs 302 (e.g., above a threshold amount) still being 'red colored'. In the case of time sensitive content, the bine cloud 306 directly injects the content from the cloud 106 to the 'red' bine hubs 302 in some examples. In other examples, the bine cloud 306 can determine that another satellite or non-satellite (e.g., local or global network) recovery is to be performed after analyzing the updated heatmap 802 as discussed herein.

Figure 9:
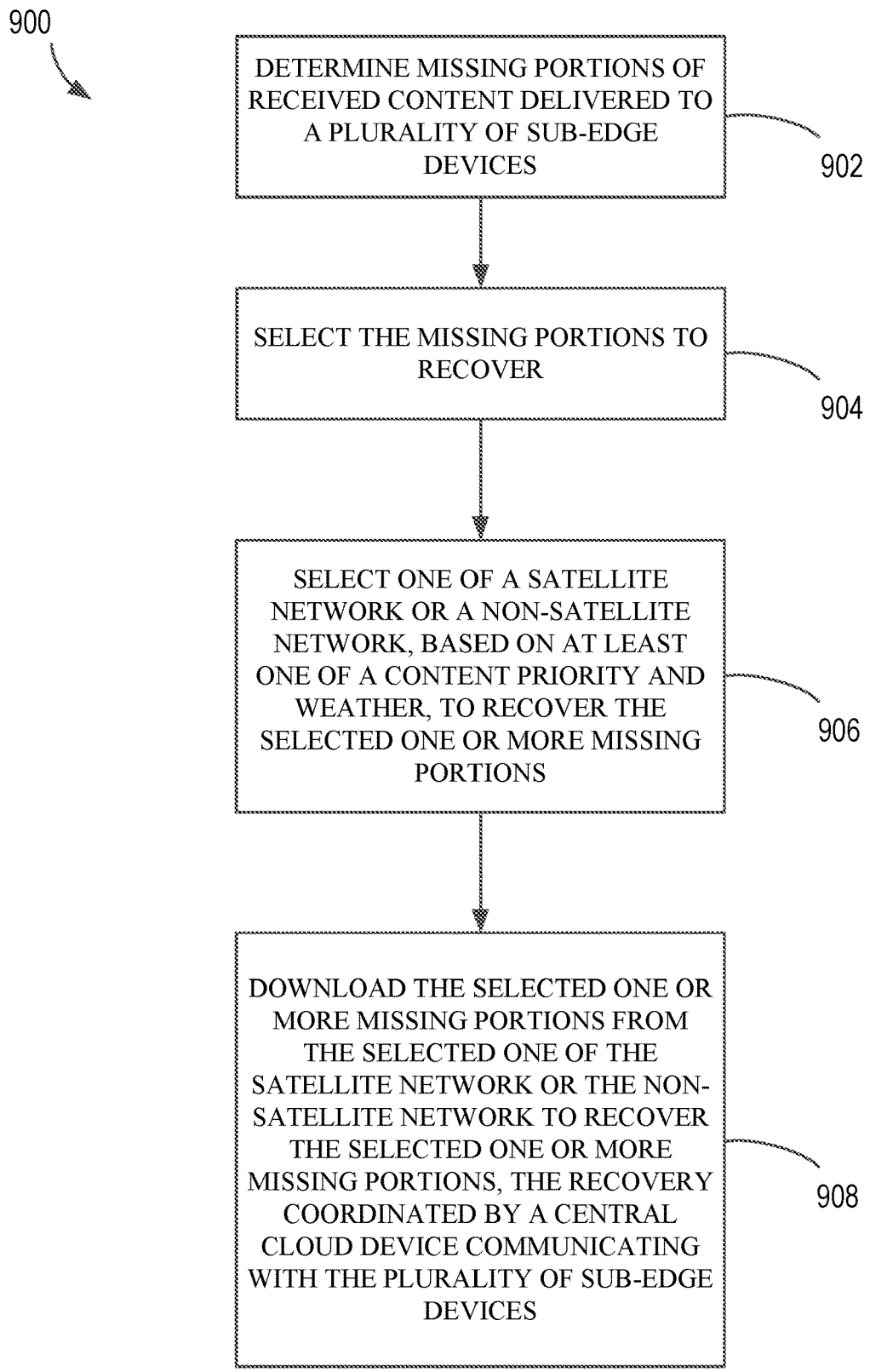
FIG. 9 is a flowchart illustrating operations of a computing device to deliver content according to an example.

FIG. 9 is a flowchart of a method 900 illustrating operations of a computing device (e.g., the computing apparatus 1002 illustrated in FIG. 10) to deliver content to sub-edge devices using a context-aware device at the sub-edge coupled with both cloud and end user devices, and using a recovery process. For example, the method 900 controls the delivery of content and recovery of missing content using different types of communication means.

It should be appreciated that the computing device may be implemented in different systems and applications. Thus, while the below-described example can be used in connection with a satellite application, the computing device configured according to the present disclosure is useable, for example, in many different applications, including any application to provide content delivery to end user devices.

More particularly, and with respect to the operations performed by the method 900, at 902 missing portions of received content delivered to a plurality of sub-edge devices (e.g., bine hubs 302) are determined. For example, a determination is made as to missing content fragments from content transmitted by satellite to the plurality of sub-edge devices. It should be noted that a recovery zone defines which sub-edge devices perform recovery of missing portions of the received content, and the recovery zone is adjustable as described herein.

At 904, the missing portions to recover are selected. For example, the specific missing fragments or groups of fragments of missing content are selected for recovery. In some examples, the missing fragments represent the content missing from all of the sub-edge devices That is, all the missing content is automatically selected for recovery is various examples.

At 906, one of a satellite network or a non-satellite network is selected, based on at least one of a content priority and weather, to recover the selected one or more missing portions. It should be noted that other recovery factors can be used to determine which network to select for delivering the missing content (e.g., expected signal strength).

At 908, the selected one or more missing portions from the selected one of the satellite network or the non-satellite network are downloaded to recover the selected one or more missing portions (e.g., inject or insert the one or more missing portions into the received content previously delivered to a plurality of sub-edge devices). The recovery is coordinated by a central cloud device communicating with the plurality of sub-edge devices. As described herein, many different factors can be used in the various steps of the recovery process. In one particular example, a weather condition, such a predicted weather or actual observer weather is used as a recovery factor by the central cloud service. The central cloud service then schedules delivery of the missing portions to the sub-edge devices.

Exemplary Operating Environment

Figure 10:
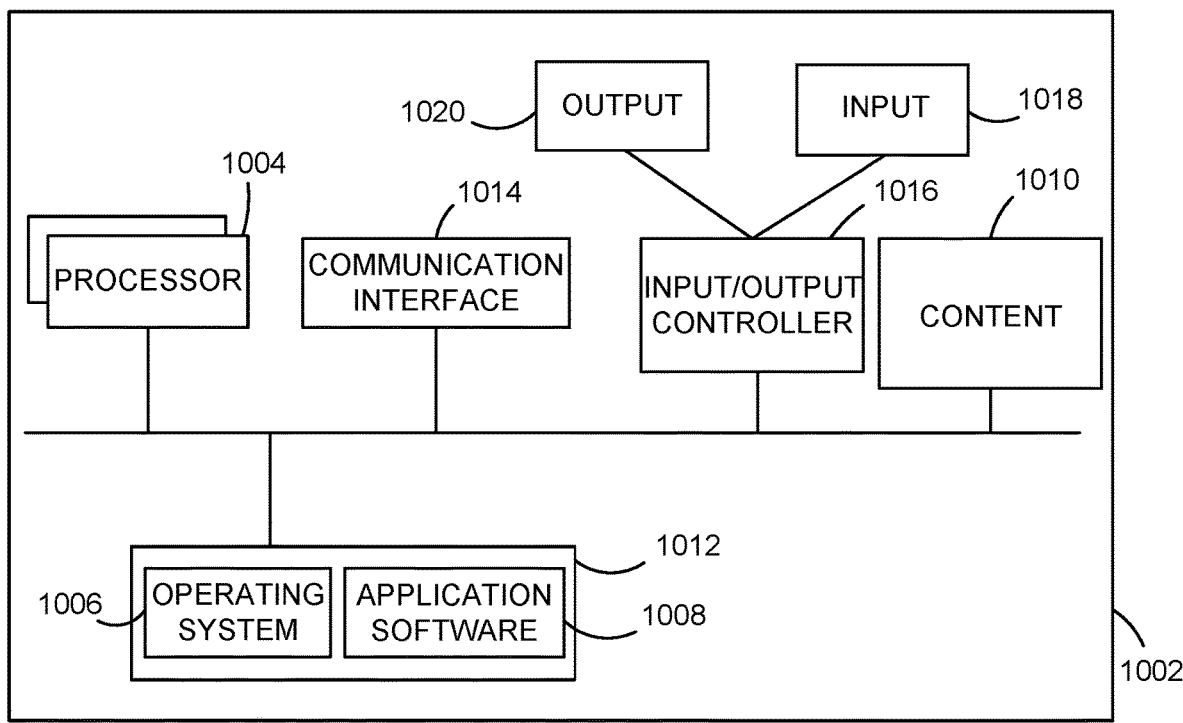
FIG. 10 illustrates a computing apparatus according to example as a functional block diagram.

The present disclosure is operable with a computing apparatus 1002 according to an example as a functional block diagram 1000 in FIG. 10, such as a hub. In one example, components of the computing apparatus 1002 may be implemented as a part of an electronic device according to one or more examples described in this disclosure. The computing apparatus 1002 comprises one or more processors 904 which may be microprocessors, controllers, or any other suitable type of processors for processing computer executable instructions to control the operation of the computing apparatus 902. Platform software comprising an operating system 1006 or any other suitable platform software may be provided on the computing apparatus 1002 to enable application software 908 to be executed on the computing apparatus 1002.

Computer executable instructions may be provided using any computer-readable media that are accessible by the computing apparatus 1002. Computer-readable media may include, for example, computer storage media such as a memory 1012 and communications media. Computer storage media, such as the memory 1012, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1012) is shown within the computing apparatus 1002, it will be appreciated by a person skilled in the art, that the storage may be distributed or located remotely and accessed via a network or other communication link (e.g. using a communication module, such as a communication interface 914).

The computing apparatus 1002 in one example includes an input/output controller 1016 configured to output information to one or more input devices 1018 and output devices 1020, for example a display or a speaker, which may be separate from or integral to the electronic device. The input/output controller 1016 in some examples is configured to receive and process an input from one or more input devices 1018, such as a control button or touchpad. In one example, the output device 1020 acts as the input device 1018. An example of such a device may be a touch sensitive display. The input/output controller 1016 in one example also outputs data to devices other than the output device 1020, e.g. a locally connected printing device. In some examples, a user provides input to the input device(s) 1018 and/or receives output from the output device(s) 1020.

The functionality described herein can be performed, at least in part, by one or more hardware logic components. According to an example, the computing apparatus 902 is configured by the program code when executed by the processor(s) 804 to execute the example of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Additionally, in some aspects, the computing apparatus 1002 is a hub configured to perform content delivery and recovery.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

A system comprises a central cloud device and a plurality of sub-edge devices configured to receive content from one or more satellites. The plurality of sub-edge devices perform recovery of missing portions of the received content and are further configured to determine the missing portions of the received content, select one or more of the missing portions to recover based at least on one or more content specific metrics or network specific metrics, select, for each of the selected one or more missing portions, one of a satellite network or a non-satellite network, based on at least one of a content priority and weather, to recover each of the selected one or more missing portions, and inject into the received content the selected one or more missing portions from the selected one of the satellite network or the non-satellite network to recover the selected one or more missing portions, the recovery coordinated by the central cloud device communicating with the plurality of sub-edge devices.

A computerized method for content delivery comprises determining missing portions of received content delivered to a plurality of sub-edge devices and selecting one or more of the missing portions to recover based at least on one or more content specific metrics or network specific metrics. The computerized method further comprises selecting, for each of the selected one or more missing portions, one of a satellite network or a non-satellite network, based on at least one of a content priority and weather, to recover each of the selected one or more missing portions, and injecting into the received content the selected one or more missing portions from the selected one of the satellite network or the non-satellite network to recover the selected one or more missing portions, the recovery coordinated by a central cloud device communicating with the plurality of sub-edge devices.

One or more computer storage media have computer-executable instructions for content delivery, upon execution by a processor, cause the processor to at least determine missing portions of received content delivered to a plurality of sub-edge devices, select one or more of the missing portions to recover based at least on one or more content specific metrics or network specific metrics, select, for each of the selected one or more missing portions, one of a satellite network or a non-satellite network, based on at least one of a content priority and weather, to recover each of the selected one or more missing portions. The computer-executable instructions, upon execution by a processor, further cause the processor to inject into the received content the selected one or more missing portions from the selected one of the satellite network or the non-satellite network to recover the selected one or more missing portions, the recovery coordinated by a central cloud device communicating with the plurality of sub-edge devices.

Alternatively, or in addition to the other examples described herein, examples include any combination of the following:
  wherein the plurality of sub-edge devices performing the recovery of the missing portions are in a recovery zone, the recovery zone defined by a latency between the plurality of sub-edge devices;
  wherein the plurality of sub-edge devices performing the recovery of the missing portions are in a recovery zone, and further comprising dynamically adjusting a size of the recovery zone based on the weather, the weather being at least one of predicted weather and observed weather;
  wherein in response to selecting the satellite network, the central cloud device sends an acknowledgment of the selected one or more missing portions to a satellite provider of the one or more satellites, and wherein the satellite provider communicates with the one or more satellites to send the selected one or more missing portions on a next orbit of the one or more satellites to the plurality of sub-edge devices;
  wherein in response to selecting the non-satellite network, the central cloud device sends an acknowledgment of the selected one or more missing portions to a satellite provider of the one or more satellites, and wherein the satellite provider packages the one or more missing portions for transmission over a broadband cellular network to the plurality of sub-edge devices;
  wherein the central cloud device prioritizes downloading of the selected one or more missing portions using an expected signal strength based at least on one of predicted weather and an orbit of the one or more satellites to determine where signal strength is expected to be at a highest level;
  wherein the central cloud device creates a heatmap of the missing portions of the received content and downloading the selected one or more missing portions is controlled based in part on the heatmap, the heatmap being created based on information shared by the plurality of sub-edge devices;
  wherein the central cloud device prioritizes downloading of the selected one or more missing portions using at least one of the content specific metrics and the network specific metrics;
  using contextual information from at least one of a user, a sub-edge, a network, or an application, preload content for an end user on the sub-edge device, and
  accessing, with the end user device, the preloaded content directly from the sub-edge over a high bandwidth network;
  wherein the preloaded content is not accessed from the cloud;
  wherein the system subsumes an intermediate context-aware sub-edge device (last-mile edge) introduced between the cloud and the end user device;
  a sub-edge device hosting third party applications, including Internet-enabled digital service businesses, wherein the third party application are at a sub-edge and act as an intermediary between a corresponding edge client and a cloud service;
  leveraging local storage and computation to enhance overall E2E network experience and/or performance for end consumer, the sub-edge device having multiple network interfaces and customized network stack to support the same, the content for end user is preloaded on the sub-edge device using contextual info (from user, sub-edge, network, application, etc.), and instead of accessing content from cloud, the end user device accesses the preloaded content directly from the sub-edge over a high bandwidth network;
  Internet-enabled digital service businesses coordinated by cloud service and augmented by sub-edge device through its intelligence, storage, and computation to optimize cloud to end user overall network utilization, cost, and performance along with higher reliability, the sub-edge device hosts third party applications (Internet-enabled digital service businesses), third party application at sub-edge acts as an intermediary between its corresponding edge client and cloud service;

using contextual information and network bandwidth diversity in content acquisition and delivery to enhance overall E2E network performance, with peer-to-peer content recovery for end user device at sub-edge level and buffered multicast of content directly from the sub-edge to the end user devices, the end user can access different parts of the same content from multiple sub-edges;

receiving demand aggregation from an existing cloud, select at least one network interface to connect to a hub, selecting content to pre-load from the existing cloud to the hub, pre-loading the selected content from the existing cloud to the hub over the at least one selected network interfaces, performing a recovery operation to store the selected content in the hub, deliver the selected content that has been recovered from the hub to an end user device;

wherein the hub is configured as a sub-edge device;

wherein the selected content is stored in the hub;

using contextual information to determine the selected content;

wherein the hub is configured as an intermediate intelligent network device;

wherein the intermediate intelligent network device is configured as a last hop network device between the end user device and the existing cloud;

wherein the hub is configured as a sub-edge device hosting multiple interfaces;

wherein the end user device is configured to communicate directly with the existing cloud;

wherein the hub is configured as an intermediate intelligent network device, the intermediate intelligent network device being a hardware device position in close proximity to a user;

allowing a cloud service to interact with standard cloud services on a cloud side;

wherein the hub is configured as a platform where clients of applications on the cloud are hosted;

wherein communication with the cloud service is available over multiple channels, and a thin service configuration is provided at the end user device;

wherein the hub operates using two five-layer network stacks, one of the five-layer network stacks to communicate with (i) the existing cloud with cross-layer customization to support multiple interfaces preselected or determined on the fly or (ii) other bine hubs, the other one of the five-layer network stacks configured to communicate with the end used device;

wherein the two five-layer network stacks are bridged at an application layer;

using metadata to select the content to pre-load;

wherein, a key is used to access the content by the end user device;

transmitting control and telemetry messages continuously from the hub to a cloud service, including at least one of application context, network interfaces, user information, or geography of deployment, and use the messages to make decisions on the selection of a delivery channel;

wherein the hub is configured to run first and third party applications, and run and store data on the hub in the form of an API;

wherein the hub is configured to use application specific policies, including at least one of sharing and deletion to maintain data sovereignty;

running one or more models on the hub, such that data is not pushed to the existing cloud;

wherein the one or more models comprise machine learning models that are application specific and allow for the hub to perform prediction operations;

wherein the one or more models are thin models;

selecting the content to pre-load based on demand and using multiple inputs, including one or more of PaaS Client metrics and bine hub metrics, wherein a prioritized content list is determined;

wherein the bine hub metrics comprises at least one of quality and cost used to determine a list of switchable network interfaces for the hub, and also using a determination of a type of the content;

using a content delivery coordinator to run an algorithm to determine the content to be pre-loaded, and wherein fragments can be sent over different channels;

running a network analyzer to determine whether transmission is multicast or broadcast;

generating a notification to a client of the end user device when the content is pre-loaded;

performing recovery operations on the pre-loaded content; and using information and predefined heuristic to make a determination of how and when to deliver the pre-loaded content.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for content delivery and recovery.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a central cloud device; and
   a plurality of sub-edge devices configured to receive content from one or more satellites, a sub-edge device of the plurality of sub-edge devices performing recovery of missing portions of the content at least by:
      determining the missing portions of the content,
      selecting one or more of the missing portions to recover based at least on one or more content specific metrics or network specific metrics,
      receiving, from the central cloud device, a content priority for each of the selected one or more of the missing portions, the content priority being based on the received content and a heatmap created based on information shared by the plurality of sub-edge devices,
      selecting, for each of the selected one or more missing portions, one of a satellite network or a non-satellite network, based on the received content priority, to recover each of the selected one or more missing portions, and
      injecting, into the received content, the selected one or more missing portions from the selected one of the satellite network or the non-satellite network to recover the selected one or more missing portions, the recovery coordinated by the central cloud device communicating with the plurality of sub-edge devices.

2. The system of claim 1, wherein the plurality of sub-edge devices performing the recovery of the missing portions are part of a recovery zone, with inclusion in the recovery zone defined by a latency associated with each of the plurality of sub-edge devices.

3. The system of claim 1, wherein the plurality of sub-edge devices performing the recovery of the missing portions are part of a recovery zone, a size of the recovery zone being dynamically adjusted based on weather, the weather being at least one of predicted weather and observed weather.

4. The system of claim 1, wherein in response to selecting the satellite network, the central cloud device sends an acknowledgment of the selected one or more missing portions to a satellite provider of the one or more satellites, and wherein the satellite provider communicates with the one or more satellites to send the selected one or more missing portions on a next orbit of the one or more satellites to the plurality of sub-edge devices, and the central cloud device prioritizes downloading of the selected one or more missing portions using an expected signal strength based at least on one of predicted weather and an orbit of the one or more satellites to determine where signal strength is expected to be at a highest level.

5. The system of claim 1, wherein in response to selecting the non-satellite network, the central cloud device sends an acknowledgment of the selected one or more missing portions to a satellite provider of the one or more satellites, and wherein the satellite provider packages the one or more missing portions for transmission over a broadband cellular network to the plurality of sub-edge devices.

6. The system of claim 1, wherein:
   the central cloud device generates an individual heatmap for each segment of the received content, wherein a color of the generated heatmap indicates a level of the missing portions of the received content in the each segment, and
   downloading the selected one or more missing portions is controlled based in part on the generated heatmap.

7. The system of claim 1, wherein:
   the central cloud device further prioritizes downloading of the selected one or more missing portions using at least one of the content specific metrics and the network specific metrics, and
   the received content includes a live streaming type content and an offline type content, the live streaming type content being prioritized higher than the offline type content.

8. A computerized method comprising:
   determining missing portions of received content delivered to a plurality of sub-edge devices;
   selecting one or more of the missing portions to recover based at least on one or more content specific metrics or network specific metrics;
   receiving a content priority for each of the selected one or more of the missing portions, the content priority being based on the received content and a heatmap created based on information shared by the plurality of sub-edge devices;
   selecting, for each of the selected one or more missing portions, one of a satellite network or a non-satellite network, based on the received content priority, to recover each of the selected one or more missing portions; and
   injecting, into the received content, the selected one or more missing portions from the selected one of the satellite network or the non-satellite network to recover the selected one or more missing portions, the recovery coordinated by a central cloud device communicating with the plurality of sub-edge devices.

9. The computerized method of claim 8, wherein the plurality of sub-edge devices performing the recovery of the missing portions are part of a recovery zone, with inclusion in the recovery zone defined by a latency associated with each of the plurality of sub-edge devices.

10. The computerized method of claim 8, wherein the plurality of sub-edge devices performing the recovery of the missing portions are part of a recovery zone, and further comprising dynamically adjusting a size of the recovery zone based on weather, the weather being at least one of predicted weather and observed weather.

11. The computerized method of claim 8, wherein in response to selecting the satellite network, the central cloud device sends an acknowledgment of the selected one or more missing portions to a satellite provider of the one or more satellites, and wherein the satellite provider communicates with the one or more satellites to send the selected one or more missing portions on a next orbit of the one or more satellites to the plurality of sub-edge devices.

12. The computerized method of claim 8, wherein in response to selecting the non-satellite network, the central cloud device sends an acknowledgment of the selected one or more missing portions to a satellite provider of the one or more satellites, and wherein the satellite provider packages the one or more missing portions for transmission over a broadband cellular network to the plurality of sub-edge devices.

13. The computerized method of claim 8, wherein in response to selecting the satellite network, the central cloud device prioritizes downloading of the selected one or more missing portions using an expected signal strength based at least on one of predicted weather and an orbit of the one or more satellites to determine where signal strength is expected to be at a highest level.

14. The computerized method of claim 8, wherein the central cloud device prioritizes downloading of the selected one or more missing portions using at least one of the content specific metrics and the network specific metrics.

15. One or more computer storage media having computer-executable instructions for content delivery, upon execution by a processor, cause the processor to at least:
   determine missing portions of received content delivered to a plurality of sub-edge devices;
   select one or more of the missing portions to recover based at least on one or more content specific metrics or network specific metrics;
   receiving a content priority for each of the selected one or more of the missing portions, the content priority being based on the received content and a heatmap created based on information shared by the plurality of sub-edge devices;
   select, for each of the selected one or more missing portions, one of a satellite network or a non-satellite network, based on the received content priority, to recover each of the selected one or more missing portions; and
   inject, into the received content, the selected one or more missing portions from the selected one of the satellite network or the non-satellite network to recover the selected one or more missing portions, the recovery coordinated by a central cloud device communicating with the plurality of sub-edge devices.

16. The one or more computer storage media of claim 15, wherein the plurality of sub-edge devices performing the recovery of the missing portions are part of a recovery zone, with inclusion in the recovery zone defined by a latency associated with each of the plurality of sub-edge devices.

17. The one or more computer storage media of claim 15, wherein the plurality of sub-edge devices performing the recovery of the missing portions are part of a recovery zone, a size of the recovery zone being dynamically adjusted based on weather, the weather being at least one of predicted weather and observed weather.

18. The one or more computer storage media of claim 15, wherein in response to selecting the satellite network, the central cloud device sends an acknowledgment of the selected one or more missing portions to a satellite provider of the one or more satellites, and wherein the satellite provider communicates with the one or more satellites to send the selected one or more missing portions on a next orbit of the one or more satellites to the plurality of sub-edge devices.

19. The one or more computer storage media of claim 15, wherein in response to selecting the non-satellite network, the central cloud device sends an acknowledgment of the selected one or more missing portions to a satellite provider of the one or more satellites, and wherein the satellite provider packages the one or more missing portions for transmission over a broadband cellular network to the plurality of sub-edge devices.

20. The one or more computer storage media of claim 15, wherein in response to selecting the satellite network, the central cloud device prioritizes downloading of the selected one or more missing portions using an expected signal strength based at least on one of predicted weather and an orbit of the one or more satellites to determine where signal strength is expected to be at a highest level.

* * * * *